United States Patent
Maruyama

(10) Patent No.: US 11,196,373 B2
(45) Date of Patent: Dec. 7, 2021

(54) CONTROL DEVICE AND CONTROL METHOD FOR SYNCHRONOUS ELECTRIC MOTOR

(71) Applicant: Sinfonia Technology Co., Ltd., Tokyo (JP)

(72) Inventor: Makoto Maruyama, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 90 days.

(21) Appl. No.: 16/646,719

(22) PCT Filed: May 14, 2018

(86) PCT No.: PCT/JP2018/018447
§ 371 (c)(1),
(2) Date: Mar. 12, 2020

(87) PCT Pub. No.: WO2019/053944
PCT Pub. Date: Mar. 21, 2019

(65) Prior Publication Data
US 2020/0274474 A1 Aug. 27, 2020

(30) Foreign Application Priority Data
Sep. 14, 2017 (JP) .............................. JP2017-176702

(51) Int. Cl.
*H02P 21/34* (2016.01)
*H02P 21/18* (2016.01)
*H02P 27/12* (2006.01)

(52) U.S. Cl.
CPC .............. *H02P 21/34* (2016.02); *H02P 21/18* (2016.02); *H02P 27/12* (2013.01); *H02P 2207/055* (2013.01)

(58) Field of Classification Search
CPC ........... H02P 21/34; H02P 21/18; H02P 27/12
(Continued)

(56) References Cited

U.S. PATENT DOCUMENTS 8,368,332 B2 * 2/2013 Imai ......................... H02P 6/22
  318/400.26
2014/0354197 A1 12/2014 Ito et al.

FOREIGN PATENT DOCUMENTS

JP  H06197589 A  7/1994
JP  2003033068 A  1/2003
(Continued)

OTHER PUBLICATIONS

Europe Patent Application No. 18856474.4, Extended European Search Report, dated Mar. 31, 2021.
(Continued)

*Primary Examiner* — David Luo
(74) *Attorney, Agent, or Firm* — Kilpatrick Townsend & Stockton LLP

(57) ABSTRACT

There is provided a control device for a synchronous electric motor that controls a drive of the synchronous electric motor. The control device includes: a limit value setting part configured to set a limit value for an output torque related value that is related to an output torque of the synchronous electric motor according to a rotation speed of the synchronous electric motor; a command generator configured to generate a voltage command based on an input command and the limit value without feeding back a current flowing through the synchronous electric motor; a PWM signal generator configured to generate a PWM signal for controlling the drive of the synchronous electric motor based on the voltage command; and a drive controller configured to control the drive of the synchronous electric motor using the PWM signal.

5 Claims, 10 Drawing Sheets

(58) Field of Classification Search
USPC .............................. 318/400.02, 400.01, 700
See application file for complete search history.

(56) References Cited

FOREIGN PATENT DOCUMENTS

| | | |
|---|---|---|
| JP | 4467520 B2 | 5/2010 |
| JP | 2012055032 A | 3/2012 |
| JP | 2014233170 A | 12/2014 |

OTHER PUBLICATIONS

Japan Patent Application No. PCT/JP2018/018447, International Search Report (and English translation), dated Aug. 7, 2018.

* cited by examiner

CONTROL DEVICE AND CONTROL METHOD FOR SYNCHRONOUS ELECTRIC MOTOR

CROSS-REFERENCE TO RELATED APPLICATIONS

This application is a national phase entry under 35 USC § 371 of International Application PCT/JP2018/018447 ("the '447 application"), filed May 14, 2018, which application claims priority to and benefits of Japan Patent Application No. 2017-176702 ("the '702 application"), filed on Sep. 14, 2017. The '447 application and the '702 applications are hereby incorporated in their entireties by this reference.

TECHNICAL FIELD

The present disclosure relates to a control device for controlling the drive of a synchronous electric motor and a control method for a synchronous electric motor.

BACKGROUND

As a control method for controlling a drive of a synchronous electric motor, there is known a PWM drive control using a PWM signal. In general, a control device that performs a PWM drive control generates a q-axis current command and a d-axis current command based on a torque command. The control device generates a PWM signal based on the q-axis current command and the d-axis current command, and outputs the PWM signal to a synchronous electric motor. As a control device that performs such a PWM drive control, for example, a motor control device disclosed in Patent Document 1 is known.

In the motor control device of Patent Document 1, a current command generator generates a q-axis current command and a d-axis current command according to a torque command, and then a current controller generates a three-phase current command based on the generated q-axis current command and d-axis current command. The current controller generates a three-phase current command using the current detected by a current detector (the current flowing through an IPM motor). The current command generated by the current controller is inputted to a main circuit part. Thus, a three-phase current flows from the main circuit part to the IPM motor.

In the motor control device of Patent Document 1, a torque limit value selection block selects a torque table that permits generation of a torque according to the torque command in a torque output priority mode but selects a torque table that limits generation of a torque according to the torque command in an efficiency priority mode.

PRIOR ART DOCUMENT

Patent Document

Patent Document 1: Japanese laid-open publication No. 2012-55032

In recent years, there has been a demand for a control device that performs a drive control of a synchronous electric motor without providing a current detector for detecting an alternating current supplied to the synchronous electric motor. That is, there is a need for a control device that performs the drive control of a synchronous electric motor without feeding back the current flowing through the synchronous electric motor.

Meanwhile, there has been studied a so-called sensorless current control that performs a drive control of a synchronous electric motor without performing current feedback. This sensorless current control is a method of calculating a voltage command value of the motor using the following motor voltage equations. The q-axis voltage command vq* and the d-axis voltage command vd* are obtained by substituting a q-axis current command iq* and a d-axis current command id* into the following equations. In addition, the following equations are voltage equations which show a steady state of a synchronous electric motor.

$$vq^* = R \cdot iq^* + \omega e \cdot Ld \cdot id^* + \omega e \cdot Ke/Pn \quad (1)$$

$$vd^* = R \cdot id^* - \omega e \cdot Lq \cdot iq^* \quad (2)$$

In these equations, R is a coil resistance, Ld is a d-axis inductance, Lq is a q-axis inductance, ωe is an electrical angular velocity, Ke is an induced voltage constant, and Pn is the number of pole pairs.

When a conventional control device that performs a drive control of a motor by feeding back a current is replaced with the control device that performs the sensorless current control as described above, it is conceivable that a current controller to which a current is fed back in the conventional control device is replaced with a voltage command calculator that calculates a voltage command by the aforementioned voltage equations.

By the way, in general, the current command is a value on the order of several hundred amperes, whereas the coil resistance R of a synchronous electric motor is a value on the order of μΩ to mΩ. The d-axis inductance Ld and the q-axis inductance Lq are also values on the order of μH to mH.

When a rotation speed of a synchronous electric motor is low, such as when the synchronous electric motor is started, the electrical angular velocity ωe becomes small. Therefore, in the aforementioned equations (1) and (2), the values of the q-axis voltage command vq* and the d-axis voltage command vd* are reduced. Then, there may be a case where the q-axis voltage command vq* and the d-axis voltage command vd* calculated from the aforementioned equations (1) and (2) fail to reach an input voltage required for the synchronous electric motor to follow a rotation speed command inputted to the control device. In this case, there is a possibility that the speed of the synchronous electric motor cannot be controlled due to the insufficient voltage command.

The present disclosure provides some embodiments of a control device for a synchronous electric motor for performing a PWM drive control without performing current feedback, which has a configuration capable of stably driving the synchronous electric motor in any rotation speed region.

SUMMARY

According to one embodiment of the present disclosure, there is provided a control device for a synchronous electric motor that controls the drive of the synchronous electric motor. The control device includes a limit value setting part configured to set a limit value for an output torque related value that is related to an output torque of the synchronous electric motor according to a rotation speed of the synchronous electric motor, a command generation part configured to generate a voltage command based on an input command and the limit value without feeding back a current flowing through the synchronous electric motor, a PWM signal generation part configured to generate a PWM signal for controlling the drive of the synchronous electric motor based on the voltage command, and a drive controller configured to control the drive of the synchronous electric motor using the PWM signal. The limit value setting part sets a start time limit value as the limit value in a startup region of the rotation speed of the synchronous electric motor, and sets a normal time limit value as the limit value in a region other than the startup region of the rotation speed of the synchronous electric motor. The start time limit value is larger than the normal time limit value and larger than the output torque related value capable of continuously rotating the synchronous electric motor at the rotation speed in the startup region.

According to another embodiment of the present disclosure, there is provided a control method for a synchronous electric motor that controls the drive of the synchronous electric motor. The control method includes a rotation speed acquisition step of acquiring a rotation speed of the synchronous electric motor, a first limit value generation step of generating a first limit value including a normal time limit value at each rotation speed of the synchronous electric motor, a second limit value generation step of generating a second limit value including a start time limit value that is larger than the normal time limit value in the startup region of the synchronous electric motor and larger than an output torque related value capable of continuously rotating the synchronous electric motor at each rotation speed of the synchronous electric motor, a limit value selection step of selecting, as a limit value, the first limit value generated in the first limit value generation step or the second limit value generated in the second limit value generation step, whichever has a larger absolute value, at each rotation speed of the synchronous electric motor, a command signal output step of outputting, as a command signal, one of a first command signal generated using the first limit value and a second command signal generated using the second limit value depending on which of the first limit value and the second limit value is selected as the limit value in the limit value selection step at each rotation speed of the synchronous electric motor, and a voltage command calculation step of calculating a voltage command corresponding to the command signal outputted in the command signal output step.

According to the control device for a synchronous electric motor of one embodiment of the present disclosure, in the drive control for controlling the drive of the synchronous electric motor using a PWM signal without feeding back a current, the start time limit value set as a limit value of an output torque related value in the startup region of the rotation speed of the synchronous electric motor is larger than the normal time limit value set as the limit value in other regions and larger than the output torque related value capable of continuously rotating the synchronous electric motor. Thus, the synchronous electric motor can be stably driven in any rotation speed region.

DETAILED DESCRIPTION

Figure 1:
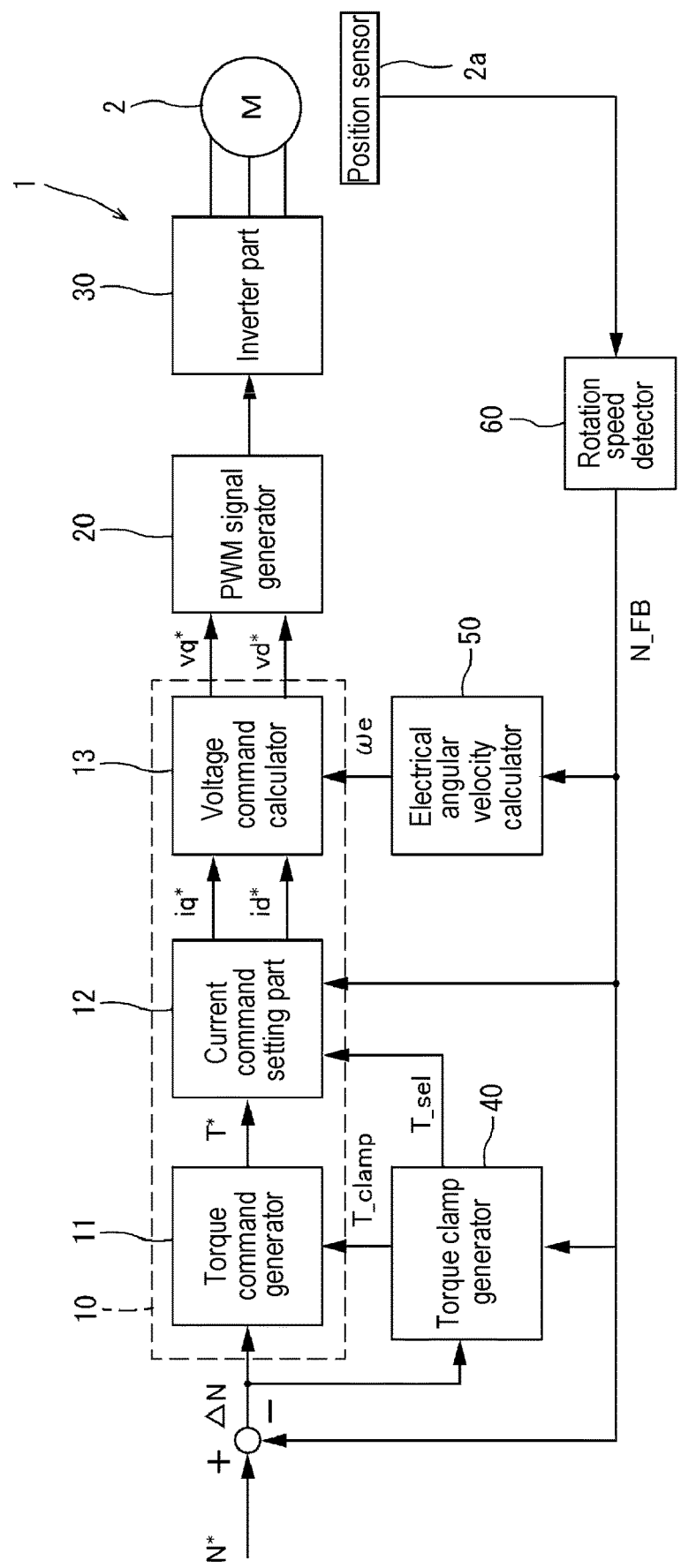
FIG. 1 is a control block diagram showing a schematic configuration of a control device according to a first embodiment.

A control device for a synchronous electric motor according to one embodiment of the present disclosure is a control device for a synchronous electric motor that controls a drive of the synchronous electric motor. The control device includes: a limit value setting part configured to set a limit value for an output torque related value that is related to an output torque of the synchronous electric motor according to a rotation speed of the synchronous electric motor; a command generator configured to generate a voltage command based on an input command and the limit value without feeding back a current flowing through the synchronous electric motor; a PWM signal generator configured to generate a PWM signal for controlling the drive of the synchronous electric motor based on the voltage command; and a drive controller configured to control a drive of the synchronous electric motor using the PWM signal. The limit value setting part sets a start time limit value as the limit value in a startup region of the rotation speed of the synchronous electric motor, and sets a normal time limit value as the limit value in a region other than the startup region of the rotation speed of the synchronous electric motor. The start time limit value is larger than the normal time limit value and larger than the output torque related value capable of continuously rotating the synchronous electric motor at the rotation speed in the startup region (first configuration).

Thus, in a so-called sensorless current control in which a PWM drive control is performed without performing feedback of a current flowing through the synchronous electric motor, the limit value for the output torque related value used when generating the PWM signal can be changed in the startup region and other regions of the rotation speed of the synchronous electric motor. Moreover, the start time limit value as the limit value set in the startup region is larger than the normal time limit value set as the limit value in other regions and larger than the output torque related value capable of continuously rotating the synchronous electric motor. Therefore, the voltage command inputted to the synchronous electric motor can be made larger than that in regions other than the startup region so that the rotation of the synchronous electric motor can be accelerated in the startup region.

Accordingly, even in the startup region where the rotation speed of the synchronous electric motor is low, the control device can generate a voltage command for inputting a voltage that can follow the rotation speed command for the synchronous electric motor. Therefore, in any rotation speed region, the synchronous electric motor can be driven to follow the rotation speed command, and the synchronous electric motor can be driven stably.

By the way, in general, a current command for generating a voltage command is often generated using a current command table. Therefore, it is conceivable to increase the current command in the current command table instead of changing the limit value of the output torque related value as in the above-described configuration. However, for this purpose, in the sensorless current control that does not perform current feedback, it is necessary to create a new current command table which is completely different from the current command table used in a current feedback control. Therefore, it takes a lot of effort to prepare such a huge amount of data.

On the other hand, the conventional current command table can be used as it is by changing the limit value for the output torque related value as described above. Therefore, in the control device for a synchronous electric motor that performs a PWM drive control without performing current feedback, a configuration capable of stably driving the synchronous electric motor in any rotation speed region can be realized with a simple configuration.

In the first configuration, the start time limit value is equal to or smaller than the output torque related value corresponding to a maximum value of a magnitude of a voltage command vector of the synchronous electric motor according to the PWM signal (second configuration).

Thus, in the startup region of the rotation speed of the synchronous electric motor, the limit value for the output torque related value used when generating the voltage command can be increased to the output torque related value corresponding to the maximum value of the voltage command vector in the PWM drive control. Therefore, in the startup region, the synchronous electric motor can be driven to reliably follow the rotation speed command. Accordingly, the synchronous electric motor can be driven more stably in the startup region.

In the first or second configuration, the limit value setting part includes a first limit value generator configured to generate a first limit value including the normal time limit value at each rotation speed of the synchronous electric motor, a second limit value generator configured to generate a second limit value including the start time limit value larger than the normal time limit value in the startup region and larger than the output torque related value capable of continuously rotating the synchronous electric motor at each rotation speed of the synchronous electric motor, and a limit value selector configured to select, as the limit value, the first limit value generated by the first limit value generator or the second limit value generated by the second limit value generator, whichever has a larger absolute value, at each rotation speed of the synchronous electric motor (third configuration).

Thus, as in the first configuration described above, at the rotation speed in the startup region of the synchronous electric motor, the start time limit value larger than the normal time limit value and larger than the output torque related value capable of continuously rotating the synchronous electric motor can be easily set as the limit value for the output torque related value. Therefore, the first configuration described above can be easily realized.

In the third configuration, the command generator includes a first command signal generator configured to generate a first command signal using the first limit value, a second command signal generator configured to generate a second command signal using the second limit value, and a command signal selector configured to select one of the first command signal and the second command signal depending on which of the first limit value and the second limit value is selected by the limit value selector at each rotation speed of the synchronous electric motor, the command generator configured to output, as the voltage command, a voltage command corresponding to the command signal selected by the command signal selector (fourth configuration).

Thus, a command signal corresponding to the limit value which is selected from the first limit value and the second limit value by the limit value selector, can be selected, and a voltage command corresponding to the command signal can be obtained. Accordingly, even when the limit value for the output torque related value is increased in the startup region of the synchronous electric motor as in the first configuration described above, the voltage command inputted to the synchronous electric motor can be increased accordingly. Therefore, the synchronous electric motor can be driven to follow the rotation speed command, and the synchronous electric motor can be driven stably.

A control method for a synchronous electric motor according to one embodiment of the present disclosure is a control method for a synchronous electric motor that controls the drive of the synchronous electric motor. The control method includes: a rotation speed acquisition step of acquiring a rotation speed of the synchronous electric motor; a first limit value generation step of generating a first limit value including a normal time limit value at each rotation speed of the synchronous electric motor; a second limit value generation step of generating a second limit value including a start time limit value larger than the normal time limit value in the startup region of the synchronous electric motor and larger than an output torque related value capable of continuously rotating the synchronous electric motor at each rotation speed of the synchronous electric motor; a limit value selection step of selecting, as a limit value, the first limit value generated in the first limit value generation step or the second limit value generated in the second limit value generation step, whichever has a larger absolute value, at each rotation speed of the synchronous electric motor; a command signal output step of outputting, as a command signal, one of a first command signal generated using the first limit value and a second command signal generated using the second limit value depending on which of the first limit value and the second limit value is selected as the limit value in the limit value selection step at each rotation speed of the synchronous electric motor; and a voltage command calculation step of calculating a voltage command corresponding to the command signal outputted in the command signal output step (first method).

Thus, in the control method for a synchronous electric motor that performs a PWM drive control without performing current feedback, the synchronous electric motor can be stably driven in any rotation speed region.

Hereinafter, embodiments of the present disclosure will be described in detail with reference to the drawings. The same or corresponding parts in the drawings are denoted by like reference numerals, and the description thereof will not be repeated.

First Embodiment (Overall Structure)

Figure 2:
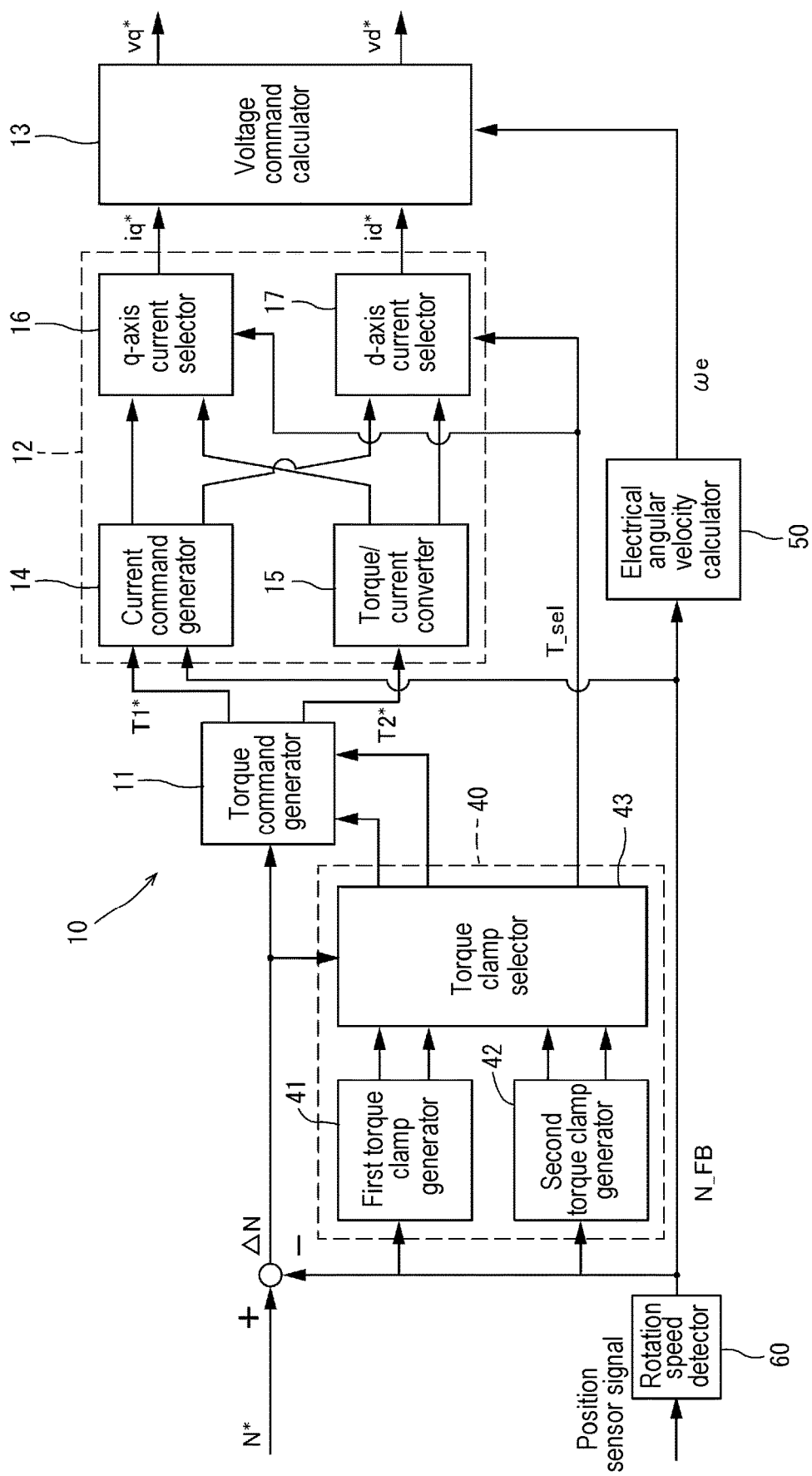
FIG. 2 is a block diagram showing a configuration from generation of a rotation speed command to generation of a voltage command in the control device.

FIG. 1 is a block diagram showing a schematic configuration of a control device 1 according to a first embodiment of the present disclosure. The control device 1 generates a PWM signal based on a rotation speed command as an input command without performing feedback of a current flowing through a motor 2 (synchronous electric motor), and controls the drive of the motor 2 using the PWM signal. Furthermore, the control device 1 considers a limit value (torque clamp value) for a torque (output torque related value) when calculating a voltage command for generating the PWM signal. FIG. 2 is a block diagram showing a configuration from the generation of a rotation speed command to the generation of a voltage command in the control device 1.

In the present embodiment, the motor 2 is a three-phase AC motor. However, the motor 2 may be a motor having any configuration. Since the configuration of the motor 2 is the same as the conventional configuration, the detailed description thereof is omitted.

As shown in FIG. 1, the control device 1 includes a command generator 10, a PWM signal generator 20, an inverter part 30 (drive controller), a torque clamp generator 40 (limit value setting part), an electrical angular velocity calculator 50 and a rotation speed detector 60. The rotation speed detector 60 outputs a signal of a rotation speed N_FB of the motor 2 based on a position sensor signal outputted from a position sensor 2a that detects a rotation position of a rotor (not shown) of the motor 2.

The command generator 10 generates a q-axis voltage command vq* and a d-axis voltage command vd* based on the rotation speed command N* (input command) inputted to the control device 1 and the rotation speed N_FB of the motor 2 outputted from the rotation speed detector 60. The generated q-axis voltage command vq* and d-axis voltage command vd* are inputted to the PWM signal generator 20.

The command generator 10 includes a torque command generator 11, a current command setting part 12 and a voltage command calculator 13.

The torque command generator 11 generates a provisional torque command for reducing a rotation speed deviation ΔN that is a difference between the rotation speed command N* inputted to the control device 1 and the rotation speed N_FB of the motor 2 outputted from the rotation speed detector 60. Since the method for obtaining the provisional torque command is the same as the conventional torque command generation method such as a PI control or the like, the detailed description thereof is omitted. In the case where the torque command generator 11 is configured by a PI controller, it is possible to shorten the time required for returning from a saturated state and to improve the control responsiveness by adding a function of preventing windup (integration saturation phenomenon) to an integrator.

Furthermore, the torque command generator 11 generates a torque command T* using the provisional torque command so as not to exceed a torque clamp value T_clamp outputted from the torque clamp generator 40. The torque clamp value T_clamp includes a positive torque clamp value that determines an upper limit of a positive range of the torque clamp value and a negative torque clamp value that determines an upper limit of an absolute value in a negative range of the torque clamp value.

When the torque clamp value generated by a second torque clamp generator 42 described later is inputted as the torque clamp value T_clamp, the torque command generator 11 outputs a torque command T1* which falls within an allowable input range permitted in a current command generator 14, as the torque command T*, to the current command generator 14 of the current command setting part 12 (see FIG. 2).

Now, the torque clamp generator 40 will be briefly described. The torque clamp generator 40 generates a torque clamp value T_clamp using the rotation speed N_FB of the motor 2 outputted from the rotation speed detector 60, and outputs the torque clamp value T_clamp to the torque command generator 11. That is, the torque clamp generator 40 generates a limit value (torque clamp value) that limits the torque command T* according to the rotation speed N_FB of the motor 2. In a low speed region and a medium speed region of the rotation speed of the motor 2, the torque clamp generator 40 sets the torque clamp value T_clamp to a value which is larger than the torque clamp value T_clamp in other regions and capable of continuously rotating the motor 2.

As will be described in detail later, the torque clamp generator 40 of the present embodiment includes a first torque clamp generator 41 (first limit value generator), a second torque clamp generator 42 (second limit value generator), and a torque clamp selector 43 (limit value selector).

The first torque clamp generator 41 generates a torque clamp value (first torque clamp value or first limit value) represented by a TN curve (relationship between a torque and a rotation speed) which is set in accordance with the characteristics of the motor 2.

The second torque clamp generator 42 generates a torque clamp value (second torque clamp value or second limit value) using the relational expression of the maximum value $v_{Limit}^*$ of the magnitude of a voltage command vector in a PWM drive control and the voltage command, and the equation (3) obtained from the following voltage equations (1) and (2). $v_{Limit}^*$ may be set to any value, and may be, for example, the maximum value of the magnitude of the voltage command vector applied to the motor 2 in a PWM control. As long as $v_{Limit}^*$ is a fixed value at each rotation speed of the motor 2, $v_{Limit}^*$ may be a different value for each rotation speed.

$$vq^* = R \cdot iq^* + \omega e \cdot Ld \cdot id^* + \omega e \cdot Ke/Pn \quad (1)$$

$$vd^* = R \cdot id^* - \omega e \cdot Lq \cdot iq^* \quad (2)$$

$$(v_{Limit}^*)^2 = (R \cdot id^* - \omega e \cdot Lq \cdot iq^*)^2 + (R \cdot iq^* + \omega e \cdot Ld \cdot id^* + \omega e \cdot Ke/Pn)^2 \quad (3)$$

In the above equations, R is a coil resistance, Ld is a d-axis inductance, Lq is a q-axis inductance, ωe is an electrical angular velocity, Ke is an induced voltage constant, and Pn is the number of pole pairs.

The torque clamp selector 43 outputs, as the torque clamp value T_clamp, the first torque clamp value generated by the first torque clamp generator 41 or the second torque clamp value generated by the second torque clamp generator 42, whichever has a larger absolute value. The torque clamp value T_clamp is inputted to the torque command generator 11 as described above.

Furthermore, the torque clamp selector 43 outputs, as a torque selection signal T_sel, the information indicating which one of the first torque clamp value and the second torque clamp value is selected, to the current command setting part 12.

The detailed configuration of the torque clamp generator 40 will be described later.

As shown in FIG. 1, the current command setting part 12 generates a q-axis current command iq* and a d-axis current command id* by using the torque command T* generated by the torque command generator 11 and the rotation speed N_FB of the motor 2 outputted from the rotation speed detector 60. In the present embodiment, the q-axis current command iq* and the d-axis current command id* correspond to a command signal.

Specifically, as shown in FIG. 2, the current command setting part 12 includes a current command generator 14 (first command signal generator), a torque/current converter 15 (second command signal generator), a q-axis current selector 16 (command signal selector) and a d-axis current selector 17 (command signal selector). The current command generator 14 generates a q-axis current command and a d-axis current command by using the torque command T* outputted from the torque command generator 11. The torque/current converter 15 generates a q-axis current command and a d-axis current command by using the torque command T* outputted from the torque command generator 11. The q-axis current selector 16 selects one of the q-axis current command generated by the current command generator 14 and the q-axis current command generated by the torque/current converter 15, based on the torque selection signal T_sel outputted from the torque clamp selector 43. The d-axis current selector 17 selects one of the d-axis current command generated by the current command generator 14 and the d-axis current command generated by the torque/current converter 15, based on the torque selection signal T_sel outputted from the torque clamp selector 43.

The current command generator 14 generates a q-axis current command and a d-axis current command based on the torque command T* outputted from the torque command generator 11 using, for example, a table or the like. In the present embodiment, the q-axis current command and the d-axis current command generated by the current command generator 14 correspond to a first command signal. Since the configuration of the current command generator 14 is the same as the conventional configuration, the detailed description thereof is omitted.

As described above, when the second torque clamp value generated by the second torque clamp generator 42 is inputted to the torque command generator 11 as the torque clamp value T_clamp, the torque command T1* falling within an allowable input range permitted in the current command generator 14 is inputted to the current command generator 14 as the torque command T*.

The torque/current converter 15 generates a q-axis current command and a d-axis current command based on the torque command T* outputted from the torque command generator 11. In the present embodiment, the q-axis current command and the d-axis current command generated by the torque/current converter 15 correspond to a second command signal. The torque command T2* clamped by the torque clamp value T_clamp is inputted to the torque/current converter 15 as the torque command T*.

The torque/current converter 15 obtains the q-axis current command by the following equation (4) which is obtained by substituting the torque command T2* for the output torque in the equation for calculating the output torque of the motor 2 (equation (9) described later).

$$iq^* = T2^*/Pn\{\varphi+(Ld-Lq)\cdot id^*\} \quad (4)$$

In the above equation, $\varphi$ is the number of magnetic flux linkages.

Furthermore, the torque/current converter 15 directly uses, as the d-axis current command, the d-axis current command used in the second torque clamp generator 42 to solve the above equation (3) for the q-axis current command as will be described later.

When the torque selection signal T_sel outputted from the torque clamp selector 43 is a signal indicating that the first torque clamp value is selected, the q-axis current selector 16 selects the q-axis current command generated by the current command generator 14. When the torque selection signal T_sel outputted from the torque clamp selector 43 is a signal indicating that the second torque clamp value is selected, the q-axis current selector 16 selects the q-axis current command generated by the torque/current converter 15. The q-axis current selector 16 outputs the selected q-axis current command to the voltage command calculator 13 as the q-axis current command iq*.

When the torque selection signal T_sel outputted from the torque clamp selector 43 is a signal indicating that the first torque clamp value is selected, the d-axis current selector 17 selects the d-axis current command generated by the current command generator 14. When the torque selection signal T_sel outputted from the torque clamp selector 43 is a signal indicating that the second torque clamp value is selected, the d-axis current selector 17 selects the d-axis current command generated by the torque/current converter 15. The d-axis current selector 17 outputs the selected d-axis current command to the voltage command calculator 13 as the d-axis current command id*.

The voltage command calculator 13 calculates a q-axis voltage command vq* and a d-axis voltage command vd* by the aforementioned voltage equations (1) and (2) using the q-axis current command iq*, the d-axis current command id*, and the electrical angular velocity $\omega e$ calculated by the electrical angular velocity calculator 50 which will be described later.

The PWM signal generator 20 generates a PWM signal for a PWM drive control based on the q-axis voltage command vq* and the d-axis voltage command vd* calculated by the voltage command calculator 13. This PWM signal is inputted to the inverter part 30 and used for controlling the drive of a switching element (not shown) of the inverter part 30.

Since each configuration of the PWM signal generator 20 and the inverter part 30 is the same as each configuration for the conventional PWM drive control, the detailed description thereof is omitted.

The electrical angular velocity calculator 50 calculates an electrical angular velocity $\omega e$ from the rotation speed N_FB of the motor 2 outputted from the rotation speed detector 60. The electrical angular velocity $\omega e$ calculated by the electrical angular velocity calculator 50 is inputted to the voltage command calculator 13. Since the configuration of the electrical angular velocity calculator 50 is also the same as the configuration in the conventional motor control device, the detailed description thereof is omitted.

(Torque Clamp Generator)

Next, the configuration of the torque clamp generator 40 will be described in detail with reference to FIG. 2.

The torque clamp generator 40 generates a torque clamp value that limits the torque command T* according to the rotation speed N_FB of the motor 2. In a low speed region and a medium speed region of the rotation speed of the motor 2, the torque clamp generator 40 sets the torque clamp value to a value which is larger than the torque clamp value in other regions and capable of continuously rotating the motor 2.

Specifically, the torque clamp generator 40 includes a first torque clamp generator 41, a second torque clamp generator 42 and a torque clamp selector 43.

The first torque clamp generator 41 generates a torque clamp value (first torque clamp value) represented by a TN curve set in accordance with the characteristics of the motor 2. That is, the first torque clamp generator 41 has the same configuration as the torque clamp generator in the conventional motor control device.

Figure 3:
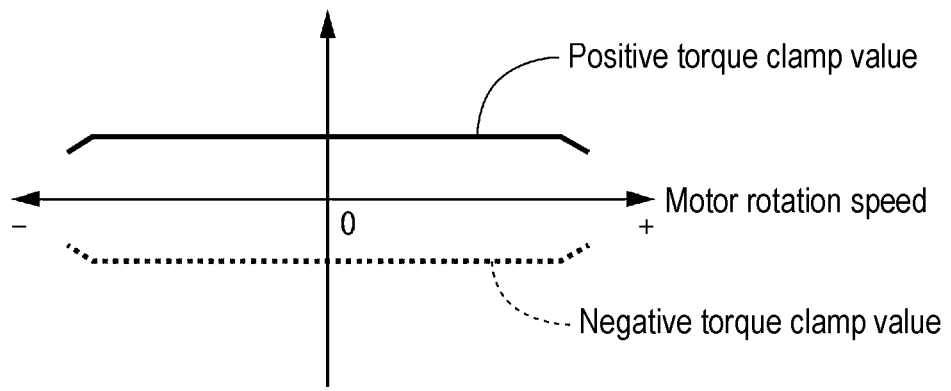
FIG. 3 is a diagram showing an example of a first torque clamp value generated by a first torque clamp generator.
Figure 4:
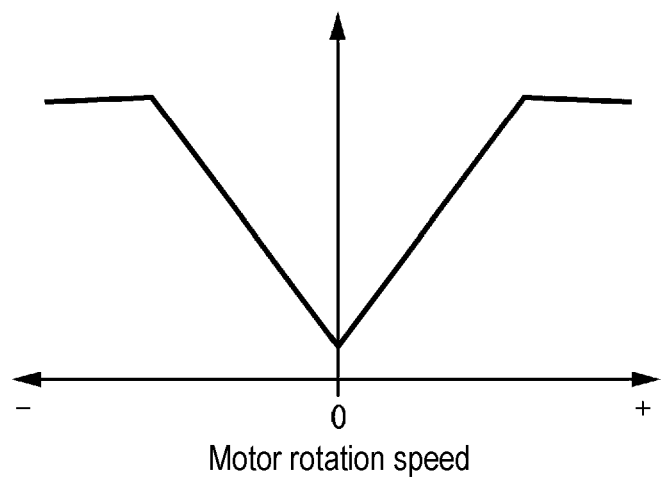
FIG. 4 is a diagram showing a magnitude of a voltage command vector obtained from a voltage command generated using the first torque clamp value.

FIG. 3 shows an example of the first torque clamp value generated by the first torque clamp generator 41. FIG. 4 shows the magnitude of the voltage command vector obtained from the voltage command generated using the first torque clamp value. As shown in FIG. 4, the magnitude of the voltage command vector is proportional to the rotation speed of the motor 2 in the low speed region and the medium speed region of the motor 2.

In FIGS. 3 and 4, the positive rotation speed means the rotation speed of the motor 2 during the forward rotation, and the negative rotation speed means the rotation speed of the motor 2 during the reverse rotation. In FIG. 3, the positive torque clamp value means the torque clamp value on the positive side, and the negative torque clamp value means the torque clamp value on the negative side.

The second torque clamp generator 42 generates a torque clamp value (second torque clamp value) using a torque corresponding to the maximum value $v_{Limit}^*$ of the magnitude of the voltage command vector in the PWM drive control. Specifically, as described above, the torque clamp value (second torque clamp value) is generated using the following equation (3).

$$vq^* = R \cdot iq^* + \omega e \cdot Ld \cdot id^* + \omega e \cdot Ke/Pn \quad (1)$$

$$vd^* = R \cdot id^* - \omega e \cdot Lq \cdot iq^* \quad (2)$$

$$(v_{Limit}^*)^2 = (R \cdot id^* - \omega e \cdot Lq \cdot iq^*)^2 + (R \cdot iq^* + \omega e \cdot Ld \cdot id^* + \omega e \cdot Ke/Pn)^2 \quad (3)$$

The above equation (3) is obtained by substituting the equations (1) and (2) into the following equation (5) representing the magnitude of the voltage command vector.

$$(v_{Limit}^*)^2 = (vd^*)^2 + (vq^*)^2 \quad (5)$$

The second torque clamp generator 42 obtains a q-axis current command by solving the above equation (3) and then obtains a corresponding torque clamp value. Hereinafter, first, a method for obtaining the q-axis current command from the above equation (3) will be described.

In the above equation (3), when obtaining the q-axis current command, the d-axis current command is set to zero or a fixed value. The reason for this is as follows.

In order to secure the output torque of the motor 2 in the startup region (in the low speed region and the medium speed region) of the rotation speed of the motor 2, the second torque clamp value generated by the second torque clamp generator 42 is mainly used in the startup region of the motor 2. Since it is not necessary to perform a field weakening control by controlling the d-axis current command in the low speed region and the medium speed region of the rotation speed of the motor 2, there is no problem even if the d-axis current command is set to zero or a fixed value as described above when the second torque clamp value is generated by the second torque clamp generator 42.

The d-axis current command may not be the same value in all the speed regions of the motor 2. That is, as long as it is a fixed value when obtaining the q-axis current command from the above equation (3), the d-axis current command may be different depending on the rotation speed of the motor 2.

In the above equation (3), if it is assumed that $R \cdot id^* = a$, $\omega e \cdot Lq = b$, $\omega e \cdot Ld \cdot id^* = c$, and $\omega e \cdot Ke/Pn = d$, the equation (3) can be expressed by the following equation.

$$(v_{Limit}^*)^2 = (a - b \cdot iq^*)^2 + (R \cdot iq^* + c + d)^2 \quad (6)$$

If this equation is rearranged for the q-axis current command, it can be expressed by the following equation.

$$(R^2 + b^2) \times (iq^*)^2 + \{2 \times (c \cdot R + d \cdot R - a \cdot b)\} \times (iq^*) + \{a^2 + c^2 + 2c \cdot d + d^2 - (v_{Limit}^*)^2\} = 0 \quad (7)$$

In the above equation, if it is assumed that $R^2 + b^2 = A$, $c \cdot R + d \cdot R - a \cdot b = B$, and $a^2 + c^2 + 2c \cdot d + d^2 - (v_{Limit}^*)^2 = C$, the equation (7) can be expressed by the following equation (8).

$$A \times (iq^*)^2 + 2B \times (iq^*) + C = 0 \quad (8)$$

The solution of the q-axis current command in the equation (8) is $iq^* = (-B \pm \sqrt{(B^2 - A \cdot C)})/A$. That is, if it is assumed that the positive q-axis current command is iq_pos* and the negative q-axis current command is iq_neg*, the solution of the equation (8) is as follows.

$$iq\_pos^* = (-B + \sqrt{(B^2 - A \cdot C)})/A$$

$$iq\_neg^* = (-B - \sqrt{(B^2 - A \cdot C)})/A$$

When $B^2 - A \cdot C < 0$, iq_pos* and iq_neg* are set to zero, respectively.

In the above-described manner, a q-axis current command corresponding to $v_{Limit}^*$ which is the maximum value of the voltage command vector is obtained. A torque clamp value on the positive side (positive torque clamp value) and a torque clamp value on the negative side (negative torque clamp value) are calculated from the obtained q-axis current command using the equation (9) which is a torque calculation equation.

$$Te = Pn \cdot \varphi \cdot iq + Pn(Ld - Lq)id \cdot iq \quad (9)$$

In the above equation, Te is an output torque of the motor 2.

By substituting the obtained iq_pos* and iq_neg* into the above equation (9), a positive torque clamp value Te_pos2 and a negative torque clamp value Te_neg2 of the second torque clamp value corresponding to $v_{Limit}^*$ which is the maximum value of the voltage command vector are obtained.

$$Te\_pos2 = Pn\{\varphi \cdot iq\_pos^* + (Ld - Lq)id^* \cdot iq\_pos^*\} \quad (10)$$

$$Te\_neg2 = Pn\{\varphi \cdot iq\_neg^* + (Ld - Lq)id^* \cdot iq\_neg^*\} \quad (11)$$

When obtaining the q-axis current command, the value (zero or fixed value) set as the d-axis current command is substituted for id* in the equations (10) and (11).

Thus, the second torque clamp value can be generated. The absolute value of the second torque clamp value is equal to or smaller than the torque clamp value corresponding to the maximum value of the magnitude of the voltage command vector of the motor 2 in the PWM drive control.

By the way, since the electrical angular velocity ωe is included in the above equation (3), the second torque clamp value calculated by the above equations (10) and (11) is a value that fluctuates depending on the rotation speed of the motor 2. Therefore, the second torque clamp generator 42 needs to update the second torque clamp value according to the rotation speed of the motor 2.

Therefore, the second torque clamp generator 42 is configured to be able to generate the second torque clamp value according to the rotation speed of the motor 2. That is, the second torque clamp generator 42 is configured to perform the calculation of equations (10) and (11) for each calculation cycle according to the rotation speed of the motor 2 outputted from the rotation speed detector 60. Thus, the second torque clamp value can be obtained in real time with respect to the change in the rotation speed of the motor 2.

The second torque clamp generator 42 may be configured to read the second torque clamp value corresponding to the rotation speed of the motor 2 from the table including the results calculated in advance using the equations (10) and (11) for each predetermined speed interval within the range between the maximum speed during forward rotation of the motor 2 and the maximum speed during reverse rotation of the motor 2. Thus, as compared with the configuration which calculates the second torque clamp value in real time as mentioned above, it is possible to reduce the amount of calculation in the control device 1.

Figure 5:
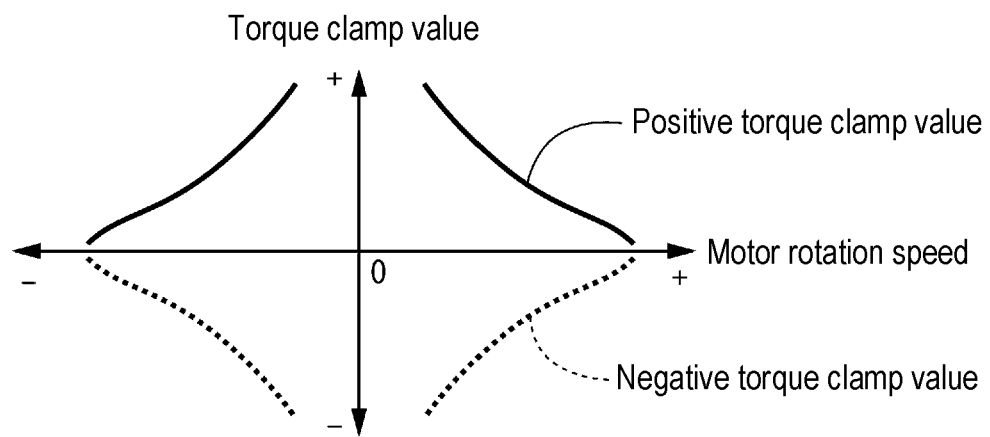
FIG. 5 is a diagram showing an example of a second torque clamp value generated by a second torque clamp generator.

FIG. 5 shows an example of the second torque clamp value generated by the second torque clamp generator 42. In FIG. 5, for the sake of explanation, the vicinity of 0 of the second torque clamp value is enlarged, and hence the illustration of a region where the absolute value of the second torque clamp value is large is omitted. As shown in FIG. 5, the second torque clamp value increases as the rotation speed of the motor 2 decreases. The absolute value of the second torque clamp value is equal to or smaller than the torque clamp value corresponding to the maximum value of the magnitude of the voltage command vector of the motor 2 in the PWM drive control.

Figure 6:
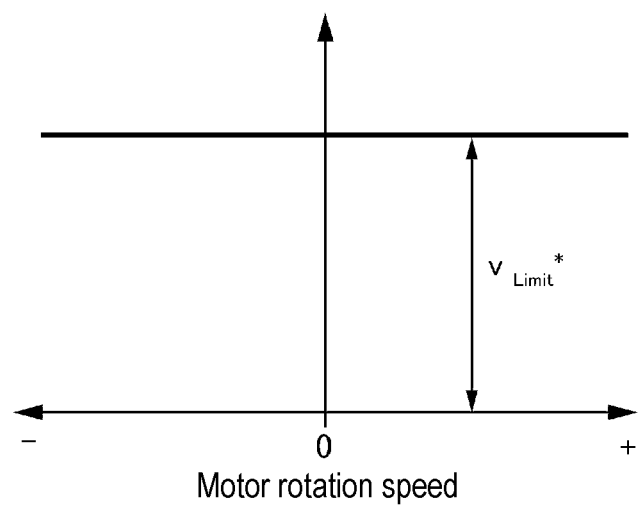
FIG. 6 is a diagram showing a magnitude of a voltage command vector obtained from a voltage command generated using the second torque clamp value.

FIG. 6 shows the magnitude of the voltage command vector obtained from the voltage command generated using the second torque clamp value. As shown in FIG. 6, the magnitude of the voltage command vector is constant at $v_{Limit}^*$.

In FIGS. 5 and 6, the positive rotation speed means the rotation speed of the motor 2 during the forward rotation, and the negative rotation speed means the rotation speed of the motor 2 during the reverse rotation. In FIG. 5, the positive torque clamp value means the torque clamp value on the positive side, and the negative torque clamp value means the torque clamp value on the negative side.

The torque clamp selector 43 outputs, as the torque clamp value T_clamp, the first torque clamp value generated by the first torque clamp generator 41 or the second torque clamp value generated by the second torque clamp generator 42, whichever has a larger absolute value. Specifically, the torque clamp selector 43 selects and outputs the positive torque clamp value generated by the first torque clamp generator 41 or the positive torque clamp value generated by the second torque clamp generator 42, whichever has a larger absolute value. Furthermore, the torque clamp selector 43 selects and outputs the negative torque clamp value generated by the first torque clamp generator 41 or the negative torque clamp value generated by the second torque clamp generator 42, whichever has a larger absolute value.

The torque clamp values thus selected are outputted to the torque command generator 11 as the torque clamp value T_clamp shown in FIG. 1.

Furthermore, the torque clamp selector 43 outputs, as a torque selection signal T_sel, the information indicating which one of the first torque clamp value and the second torque clamp value is selected, to the current command setting part 12. For example, when the first torque clamp value is selected, the torque clamp selector 43 outputs a signal of "0" as the torque selection signal T_sel. When the second torque clamp value is selected, the torque clamp selector 43 outputs a signal of "1" as the torque selection signal T_sel.

When the first torque clamp generator 41 or the second torque clamp generator 42, whichever has selected the positive torque clamp value, differs from the first torque clamp generator 41 or the second torque clamp generator 42, whichever has selected the negative torque clamp value, the torque clamp selector 43 determines which signal corresponding to the torque clamp generator is outputted as the torque selection signal T_sel, based on the rotation speed deviation ΔN between the rotation speed command N* and the rotation speed N_FB of the motor 2.

That is, when the rotation speed deviation ΔN is negative, the rotation speed N* of the motor 2 exceeds the rotation speed command N_FB. Therefore, the torque clamp selector 43 outputs, as the torque selection signal T_sel, a signal corresponding to the first torque clamp generator 41 or the second torque clamp generator 42, whichever has selected the negative torque clamp value, so that the motor 2 can output a negative torque.

On the other hand, when the rotation speed deviation ΔN is positive, the rotation speed N_FB of the motor 2 fails to reach the rotation speed command N*. Therefore, the torque clamp selector 43 outputs, as the torque selection signal T_sel, a signal corresponding to the first torque clamp generator 41 or the second torque clamp generator 42, whichever has selected the positive torque clamp value, so that the motor 2 can output a positive torque.

Figure 7:
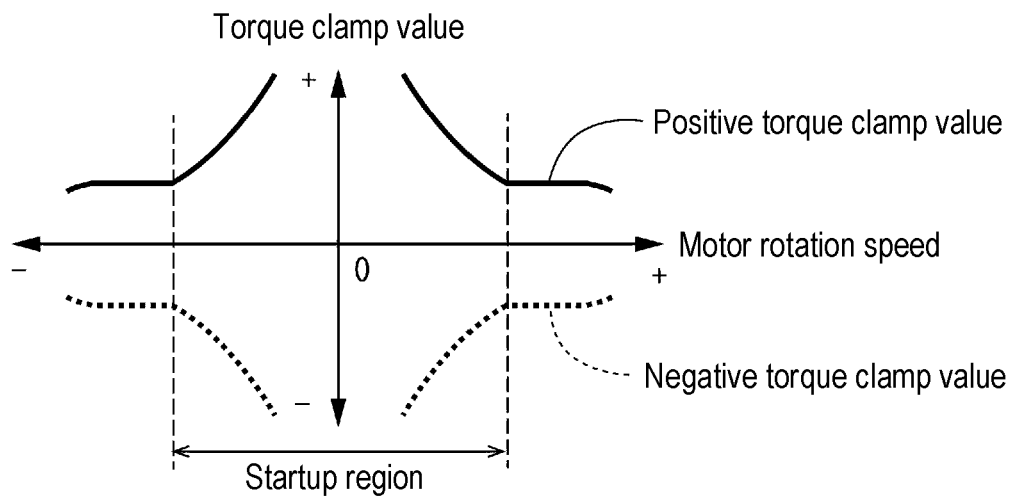
FIG. 7 is a diagram showing an example of a torque clamp value when the first torque clamp value or the second torque clamp value, whichever has a larger absolute value, is selected by a torque clamp selector.

FIG. 7 shows an example of the torque clamp value when the torque clamp selector 43 selects the first torque clamp value or the second torque clamp value, whichever has a larger absolute value. In FIG. 7, for the sake of explanation, the vicinity of 0 of the torque clamp value is enlarged, and hence the illustration of a region where the absolute value of the torque clamp value is large is omitted.

Figure 8:
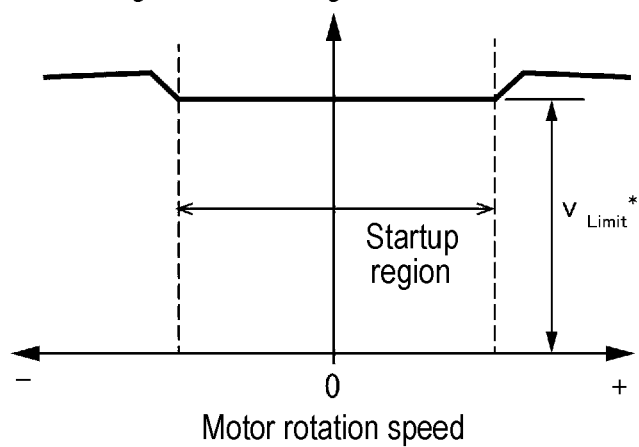
FIG. 8 is a diagram showing a magnitude of a voltage command vector obtained from a voltage command generated using the torque clamp value shown in FIG. 7.

FIG. 8 shows the magnitude of the voltage command vector obtained from the voltage command generated using the torque clamp value shown in FIG. 7.

In FIGS. 7 and 8, the positive rotation speed means the rotation speed of the motor 2 during the forward rotation, and the negative rotation speed means the rotation speed of the motor 2 during the reverse rotation. In FIG. 7, the positive torque clamp value means the torque clamp value on the positive side, and the negative torque clamp value means the torque clamp value on the negative side.

As shown in FIG. 7, the second torque clamp value is selected as the torque clamp value T_clamp in the low speed region and the medium speed region of the rotation speed of the motor 2, and the first torque clamp value is selected as the torque clamp value T_clamp in the high speed region of the rotation speed of the motor 2. Accordingly, as shown in FIG. 8, in the low speed region and the medium speed region of the rotation speed of the motor 2, the magnitude of the voltage command vector is also the magnitude of the voltage command vector obtained from the voltage command generated using the second torque clamp value. In the high speed region of the rotation speed of the motor 2, the magnitude of the voltage command vector is the magnitude of the voltage command vector obtained from the voltage command generated using the first torque clamp value. In FIG. 7, the absolute value of the torque clamp value is equal to or smaller than the torque clamp value corresponding to the maximum value of the magnitude of the voltage command vector of the motor 2 in the PWM drive control.

In this regard, the low speed region and the medium speed region of the rotation speed of the motor 2 are the startup region of the motor 2. That is, the startup region is a region where the second torque clamp value is selected as the torque clamp value T_clamp in FIG. 7. In addition, the second torque clamp value, which is selected as the torque clamp value T_clamp in the low speed region and the medium speed region of the rotation speed of the motor 2, is a start time limit value, and the first torque clamp value selected as the torque clamp value T_clamp in the high speed region of the rotation speed of the motor 2 is a normal time limit value.

With the configuration of the present embodiment, as shown in FIG. 7, the torque clamp value in the startup region of the rotation speed of the motor 2 can be made larger than the torque clamp value in other regions. Moreover, the torque clamp value in the startup region can be set to a value larger than a value capable of continuously rotating the motor 2, i.e., a value capable of accelerating the motor 2.

Furthermore, with the configuration of the present embodiment, as shown in FIG. 8, a voltage vector equal to or larger than $v_{Limit}^*$ can be generated in all the rotation speed regions of the motor 2.

As described above, by generating the torque clamp value using the torque clamp generator 40 of the present embodiment, the torque clamp value synthesized according to the rotation speed of the motor 2 can be obtained from the torque clamp values generated by the first torque clamp generator 41 and the second torque clamp generator 42, respectively. Therefore, in the low speed region and the medium speed region of the rotation speed of the motor 2, the torque clamp value can be made larger than that in the high speed region, and the torque clamp value can be set to a value larger than a value capable of continuously rotating the motor 2, i.e., a value capable of accelerating the motor 2.

Therefore, a larger voltage command can be inputted to the motor 2 in the region including the startup region of the motor 2, and the motor 2 can be accelerated stably. Accordingly, it is possible to stably drive the motor 2.

(Voltage Command Generation Operation)

Figure 9:
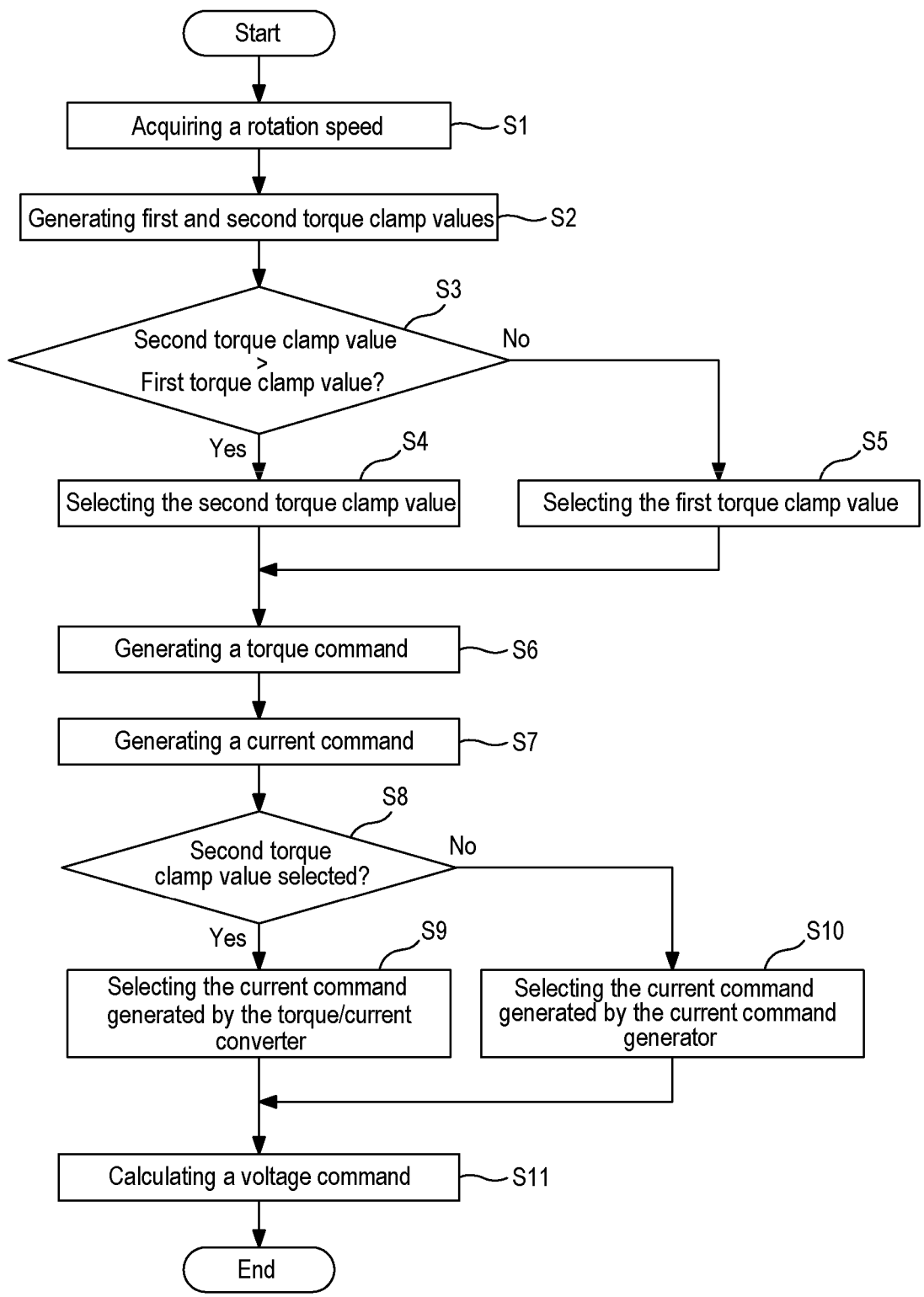
FIG. 9 is a flowchart showing a voltage command generation operation performed by a torque clamp generator and a command generator.

Next, a voltage command generation operation will be described with reference to FIG. 9. FIG. 9 is a flowchart showing a voltage command generation operation performed by the torque clamp generator 40 and the command generator 10.

When the flow shown in FIG. 9 is started (START), each of the first torque clamp generator 41 and the second torque clamp generator 42 of the torque clamp generator 40 acquires a rotation speed N_FB of the motor 2 outputted from the rotation speed detector 60, in step S1.

In the subsequent step S2, the first torque clamp generator 41 generates a first torque clamp value, and the second torque clamp generator 42 generates a second torque clamp value. The first torque clamp generator 41 generates a positive torque clamp value and a negative torque clamp value as the first torque clamp value. The second torque clamp generator 42 generates a positive torque clamp value and a negative torque clamp value as the second torque clamp value. Thereafter, in steps S3 to S5, the torque clamp selector 43 selects the first torque clamp value or the second torque clamp value, whichever has a larger absolute value, as the torque clamp value T_clamp, and outputs the selected torque clamp value to the torque command generator 11.

Specifically, in step S3, the torque clamp selector 43 determines whether or not the absolute value of the second torque clamp value is larger than the absolute value of the first torque clamp value. The torque clamp selector 43 compares the absolute value of the positive torque clamp value of the first torque clamp value with the absolute value of the positive torque clamp value of the second torque clamp value, and also compares the absolute value of the negative torque clamp value of the first torque clamp value with the absolute value of the negative torque clamp value of the second torque clamp value.

If it is determined in step S3 that the absolute value of the second torque clamp value is larger than the absolute value of the first torque clamp value (if YES), the torque clamp selector 43 selects the second torque clamp value as the torque clamp value T_clamp, in step S4.

Specifically, if the absolute value of the positive torque clamp value of the second torque clamp value is larger than the absolute value of the positive torque clamp value of the first torque clamp value, the torque clamp selector 43 outputs the positive torque clamp value of the second torque clamp value as the positive torque clamp value T_clamp. In addition, if the absolute value of the negative torque clamp value of the second torque clamp value is larger than the absolute value of the negative torque clamp value of the first torque clamp value, the torque clamp selector 43 outputs the negative torque clamp value of the second torque clamp value as the negative torque clamp value T_clamp.

On the other hand, if it is determined in step S3 that the absolute value of the second torque clamp value is equal to or smaller than the absolute value of the first torque clamp value (if NO), the torque clamp selector 43 selects the first torque clamp value as the torque clamp value T_clamp, in step S5.

Specifically, if the absolute value of the positive torque clamp value of the second torque clamp value is equal to or smaller than the absolute value of the positive torque clamp value of the first torque clamp value, the torque clamp selector 43 outputs the positive torque clamp value of the first torque clamp value as the positive torque clamp value T_clamp. In addition, if the absolute value of the negative torque clamp value of the second torque clamp value is equal to or smaller than the absolute value of the negative torque clamp value of the first torque clamp value, the torque clamp selector 43 outputs the negative torque clamp value of the first torque clamp value as the negative torque clamp value T_clamp.

After selecting the torque clamp value T_clamp in steps S4 and S5, the torque clamp selector 43 outputs, as a torque selection signal T_sel, the information indicating which of the first torque clamp value and the second torque clamp value is selected.

When the rotation speed deviation ΔN between the rotation speed command N* and the rotation speed N_FB of the motor 2 that is outputted from the rotation speed detector 60 is negative, the rotation speed N_FB of the motor 2 exceeds the rotation speed command N*. Therefore, the torque clamp selector 43 outputs, as the torque selection signal T_sel, a signal corresponding to the first torque clamp generator 41 or the second torque clamp generator 42, whichever has selected the negative torque clamp value, so that the motor 2 can output a negative torque.

On the other hand, when the rotation speed deviation ΔN is positive, the rotation speed N_FB of the motor 2 fails to reach the rotation speed command N*. Therefore, the torque clamp selector 43 outputs, as the torque selection signal T_sel, a signal corresponding to the first torque clamp generator 41 or the second torque clamp generator 42, whichever has selected the positive torque clamp value, so that the motor 2 can output a positive torque.

In step S6, the torque command generator 11 generates a torque command T* based on the rotation speed deviation ΔN and the torque clamp value T_clamp outputted from the torque clamp selector 43 in steps S4 and S5.

In the subsequent step S7, the current command generator 14 generates a q-axis current command and a d-axis current command based on the torque command T* generated by the torque command generator 11, and the torque/current converter 15 generates a q-axis current command and a d-axis current command based on the torque command T* generated by the torque command generator 11. The q-axis current commands generated by the current command generator 14 and the torque/current converter 15 are outputted to the q-axis current selector 16, and the d-axis current commands generated by the current command generator 14 and the torque/current converter 15 are outputted to the d-axis current selector 17.

The torque command inputted from the torque command generator 11 to the current command generator 14 is a torque command T1* falling within an allowable input range permitted by the current command generator 14. The torque command inputted from the torque command generator 11 to the torque/current converter 15 is a torque command T2* which is the same as the torque command T*.

Thereafter, in steps S8 to S10, the q-axis current selector 16 selects one of the q-axis current commands generated by the current command generator 14 and the torque/current converter 15, based on the torque selection signal T_sel outputted from the torque clamp selector 43. In step S8, the d-axis current selector 17 selects one of the d-axis current commands generated by the current command generator 14 and the torque/current converter 15, based on the torque selection signal T_sel outputted from the torque clamp selector 43.

Specifically, in step S8, the q-axis current selector 16 and the d-axis current selector 17 determine whether the torque selection signal T_sel corresponds to the second torque clamp value, i.e., whether the torque clamp selector 43 has selected the second torque clamp value.

If it is determined in step S8 that the torque clamp selector 43 has selected the second torque clamp value (if YES), the q-axis current selector 16 and the d-axis current selector 17 select the q-axis current command and the d-axis current command generated by the torque/current converter 15, in step S9. On the other hand, if it is determined in step S8 that the torque clamp selector 43 has selected the first torque clamp value (if NO), the q-axis current selector 16 and the d-axis current selector 17 select the q-axis current command and the d-axis current command generated by the current command generator 14, in step S10. The selected q-axis current command and d-axis current command are outputted to the voltage command calculator 13 as a q-axis current command iq* and a d-axis current command id*.

Thereafter, the flow proceeds to step S11 where the voltage command calculator 13 calculates and outputs a q-axis voltage command vq* and a d-axis voltage command vd* based on the q-axis current command iq* and the d-axis current command id*. Thereafter, the flow is ended (END).

In this regard, step S1 corresponds to a rotation speed acquisition step, and step S2 corresponds to a first limit value generation step and a second limit value generation step. Steps S3 to S5 correspond to a limit value selection step, steps S7 to S10 correspond to a command signal output step, and step S11 corresponds to a voltage command calculation step.

As described above, in the present embodiment, the torque clamp value T_clamp used when generating the torque command can be generated using the first torque clamp value and the second torque clamp value generated by the first torque clamp generator 41 and the second torque clamp generator 42. That is, the first torque clamp generator 41 and the second torque clamp generator 42 can switch the torque clamp value to an appropriate value according to the rotation speed of the motor 2.

Accordingly, in the startup region of the rotation speed of the motor 2, the torque clamp value can be set to a torque clamp value capable of accelerating the rotation of the motor 2. In other regions, the torque clamp value can be set to a torque clamp value of a TN curve corresponding to the characteristics of the motor 2. Thus, the torque clamp value in the startup region can be set to a value which is larger than the torque clamp value in other regions and capable of accelerating the motor 2.

Thus, in the so-called sensorless current control in which a PWM drive control is performed without performing feedback of a current flowing through the synchronous electric motor, the voltage command large enough to accelerate the motor 2 can be inputted to the motor 2 in the startup region of the rotation speed of the motor 2. Accordingly, even in the startup region of the rotation speed of the motor 2, the motor 2 can be driven to follow the rotation speed command. Therefore, in any rotation speed region, the motor 2 can be driven stably.

By the way, in general, a current command for generating a voltage command is often generated using a current command table. Therefore, it is conceivable to increase the current command in the current command table instead of changing the torque clamp value T_clamp as in the above-described configuration. However, for this purpose, in the sensorless current control that does not perform current feedback, it is necessary to create a new current command table which is completely different from the current command table used in a current feedback control. It takes a lot of effort to prepare a huge amount of data.

On the other hand, the conventional current command table can be used as it is by changing the torque clamp value in the startup region of the rotation speed of the motor 2 as in the present embodiment. Therefore, in the control device 1 for the motor 2 that performs a PWM drive control without performing current feedback, a configuration capable of stably driving the motor 2 in any rotation speed region can be realized with a simple configuration.

In the present embodiment, the second torque clamp value is equal to or smaller than the torque clamp value corresponding to the maximum value of the magnitude of the voltage command vector of the PWM drive control in the startup region of the rotation speed of the motor 2. Thus, the largest voltage command can be inputted to the motor 2 in the startup region of the rotation speed of the motor 2. Accordingly, the motor 2 can be made to follow the rotation speed command in a more reliable manner.

Second Embodiment

Figure 10:
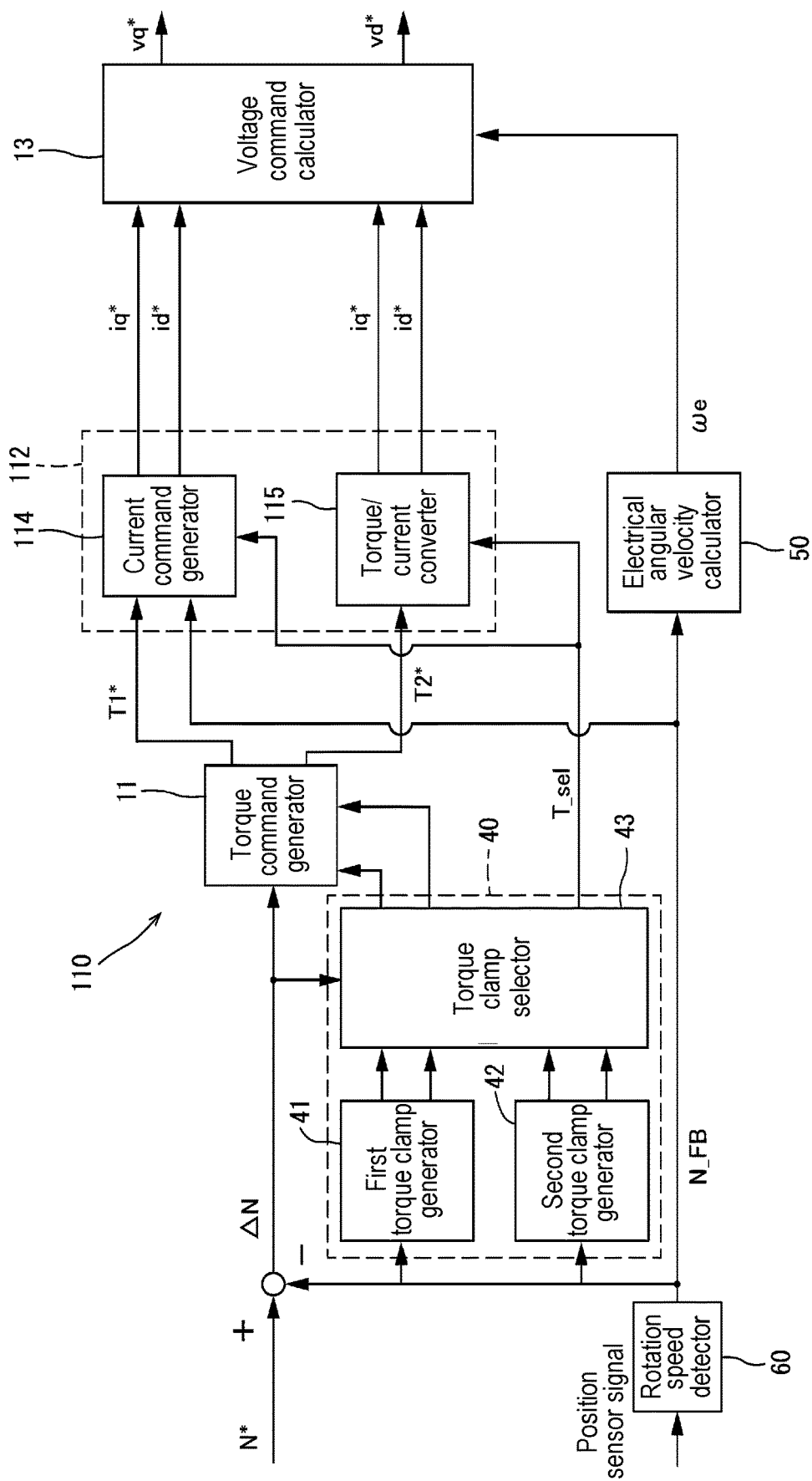
FIG. 10 is a block diagram showing a configuration from generation of a rotation speed command to generation of a voltage command in a control device according to a second embodiment.

FIG. 10 is a block diagram showing a configuration from the generation of a rotation speed command to the generation of a voltage command in a control device according to a second embodiment. The present embodiment is different in configuration from the first embodiment in that the torque selection signal T_sel outputted from the torque clamp selector 43 is inputted to the current command generator 114 and the torque/current conversion unit 115. Hereinafter, the same components as those of the first embodiment are denoted by like reference numerals, and the description thereof is omitted. Only the components different from those of the first embodiment will be described.

As shown in FIG. 10, the command generator 110 includes a torque command generator 11, a current command setting part 112 and a voltage command calculator 13. In the command generator 110, the torque selection signal T_sel outputted from the torque clamp selector 43 is inputted to the current command generator 114 and the torque/current converter 115.

Each of the current command generator 114 and the torque/current converter 115 determines whether it is necessary to generate a current command according to the torque selection signal T_sel. That is, when the torque selection signal T_sel is a signal indicating that the first torque clamp value has been selected, the current command generator 114 generates a q-axis current command iq* and a d-axis current command id*, while the torque/current converter 115 does not generate a current command. When the torque selection signal T_sel is a signal indicating that the second torque clamp value has been selected, the torque/current converter 115 generates a q-axis current command iq* and a d-axis current command id*, while the current command generator 114 does not generate a current command.

The configurations of the current command generator 114 other than the above-described configurations are the same as the configurations of the current command generator 14 of the first embodiment. Similarly, the configurations of the torque/current converter 115 other than the above-described configurations are the same as the configurations of the torque/current converter 15 of the first embodiment. Therefore, the detailed configurations of the current command generator 114 and the torque/current converter 115 will not be described.

With the configuration of the present embodiment, the current command can be selectively generated according to the torque selection signal T_sel outputted from the torque clamp selector 43. Therefore, it is possible to omit the q-axis current selector 16 and the d-axis current selector 17 adopted in the first embodiment.

Third Embodiment

Figure 11:
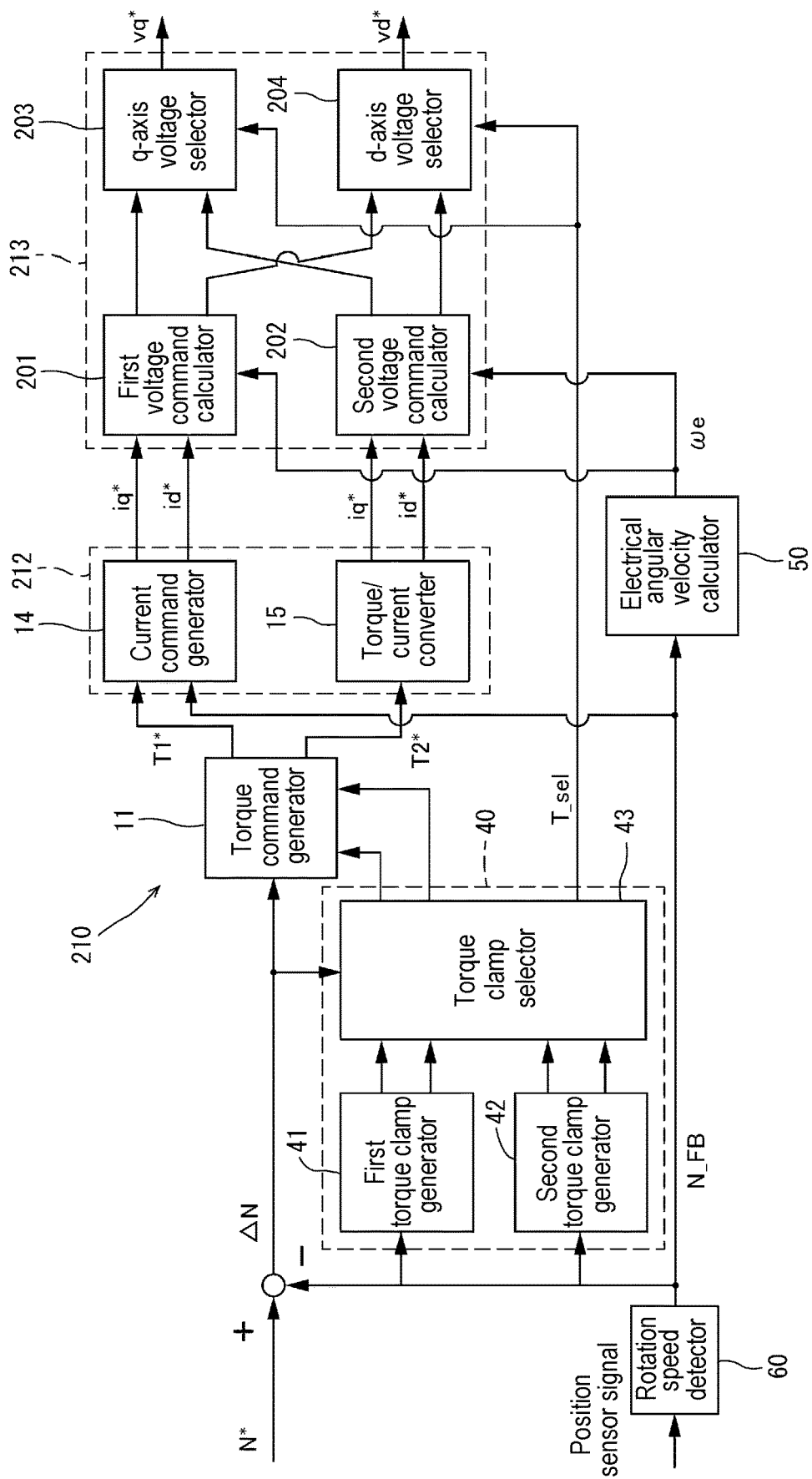
FIG. 11 is a block diagram showing a configuration from generation of a rotation speed command to generation of a voltage command in a control device according to a third embodiment.

FIG. 11 is a block diagram showing a configuration from the generation of a rotation speed command to the generation of a voltage command in a control device according to a third embodiment. In the present embodiment, the configuration of the command generator 210 is different from the configuration of the command generator 10 adopted in the first embodiment. Hereinafter, the same components as those of the first embodiment are denoted by like reference numerals, and the description thereof is omitted. Only the components different from those of the first embodiment will be described.

As shown in FIG. 11, the command generator 210 calculates a q-axis voltage command and a d-axis voltage command, and then selects each of the q-axis voltage command and the d-axis voltage command according to the torque selection signal T_sel outputted from the torque clamp selector 43.

Specifically, the command generator 210 includes a torque command generator 11, a current command setting part 212 and a voltage command calculator 213.

The current command setting part 212 includes a current command generator 14 and a torque/current converter 15. The current command generator 14 generates a q-axis current command iq* and a d-axis current command id* according to the torque command outputted from the torque command generator 11 as in the configuration of the first embodiment. The torque/current converter 15 generates a q-axis current command iq* and a d-axis current command id* according to the torque command outputted from the torque command generator 11 as in the configuration of the first embodiment.

The voltage command calculator 213 includes a first voltage command calculator 201 (first command signal generator), a second voltage command calculator 202 (second command signal generator), a q-axis voltage selector 203 (command signal selector) and a d-axis voltage selector 204 (command signal selector).

The first voltage command calculator 201 calculates a q-axis voltage command and a d-axis voltage command based on the q-axis current command iq* and the d-axis current command id*, which are outputted from the current command generator 14, and the electrical angular velocity ωe outputted from the electrical angular velocity calculator 50. The second voltage command calculator 202 calculates a q-axis voltage command and a d-axis voltage command based on the q-axis current command iq* and the d-axis current command id*, which are outputted from the torque/current converter 15, and the electrical angular velocity ωe outputted from the electrical angular velocity calculator 50. In the present embodiment, the q-axis voltage command and the d-axis voltage command respectively calculated by the first voltage command calculator 201 and the second voltage command calculator 202 correspond to a command signal. Since each of the configurations of the first voltage command calculator 201 and the second voltage command calculator 202 is the same as the configuration of the voltage command calculator 13 of the first embodiment, the detailed description thereof is omitted.

The q-axis voltage selector 203 selects one of the q-axis voltage command calculated by the first voltage command calculator 201 and the q-axis voltage command calculated by the second voltage command calculator 202, based on the torque selection signal T_sel outputted from the torque clamp selector 43.

Specifically, when the torque selection signal T_sel outputted from the torque clamp selector 43 is a signal indicating that the first torque clamp value has been selected, the q-axis voltage selector 203 selects the q-axis voltage command calculated by the first voltage command calculator 201. When the torque selection signal T_sel outputted from the torque clamp selector 43 is a signal indicating that the second torque clamp value has been selected, the q-axis voltage selector 203 selects the q-axis voltage command calculated by the second voltage command calculator 202. The q-axis voltage selector 203 outputs the selected q-axis voltage command as a q-axis voltage command vq*.

The d-axis voltage selector 204 selects one of the d-axis voltage command calculated by the first voltage command calculator 201 and the d-axis voltage command calculated by the second voltage command calculator 202, based on the torque selection signal T_sel outputted from the torque clamp selector 43.

Specifically, when the torque selection signal T_sel outputted from the torque clamp selector 43 is a signal indicating that the first torque clamp value has been selected, the d-axis voltage selector 204 selects the d-axis voltage command calculated by the first voltage command calculator 201. When the torque selection signal T_sel outputted from the torque clamp selector 43 is a signal indicating that the second torque clamp value has been selected, the d-axis voltage selector 204 selects the d-axis voltage command calculated by the second voltage command calculator 202. The d-axis voltage selector 204 outputs the selected d-axis voltage command as a d-axis voltage command vd*.

Even in the configuration of the present embodiment, the torque clamp value can be set to a torque clamp value capable of accelerating the rotation of the motor 2 in the startup region of the rotation speed of the motor 2, while the torque clamp value can be set to a torque clamp value of a TN curve corresponding to the characteristics of the motor 2 in other regions. Therefore, the motor 2 can be driven to follow the rotation speed command even in the startup region of the rotation speed of the motor 2. Thus, the motor 2 can be driven stably in any rotation speed region.

Fourth Embodiment

Figure 12:
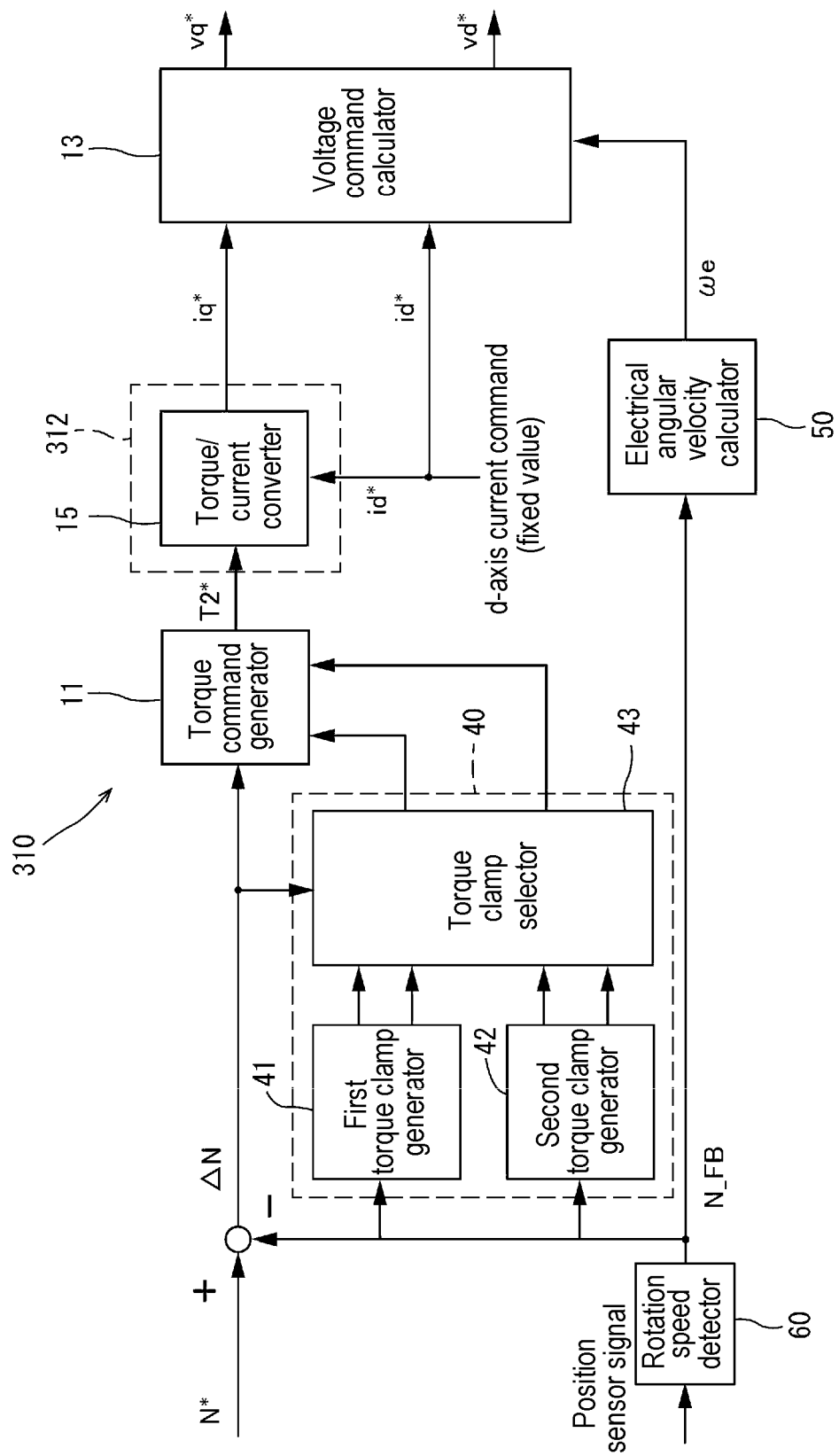
FIG. 12 is a block diagram showing a configuration from generation of a rotation speed command to generation of a voltage command in a control device according to a fourth embodiment.

FIG. 12 is a block diagram showing a configuration from the generation of a rotation speed command to the generation of a voltage command in a control device according to a fourth embodiment. In the present embodiment, the configuration of the command generator 310 is different from the configuration of the command generator 10 of the first embodiment. Hereinafter, the same components as those of the first embodiment are denoted by like reference numerals, and the description thereof is omitted. Only the components different from those of the first embodiment will be described.

When an SPM (Surface Permanent Magnet Motor) is used as the motor 2, there may be a case where speed control is performed by setting a d-axis current to zero or a fixed value in all the speed regions of the motor 2. In this case, it is not necessary to use a current command table. Therefore, the current command generator of the first embodiment can be omitted.

The configuration of the present embodiment is a configuration in which the current command generator is omitted from the configuration of the first embodiment in the above case.

Specifically, as shown in FIG. 12, the command generator 310 includes a torque command generator 11, a current command setting part 312 and a voltage command calculator 13. The current command setting part 312 includes a torque/current converter 15. When the d-axis current command is a fixed value, the d-axis current command is inputted to the torque/current converter 15. The configuration of the torque/current converter 15 is the same as that of the first embodiment.

In the case where the motor 2 is an SPM, if the reluctance torque represented by the second term on the right side of the equation (9) is regarded as zero, it is not necessary to input a d-axis current command to the torque/current converter 15.

With the configuration of the present embodiment, when the d-axis current command is set to zero or a fixed value, it is possible to simplify the configuration of the current command setting part 312.

Fifth Embodiment

Figure 13:
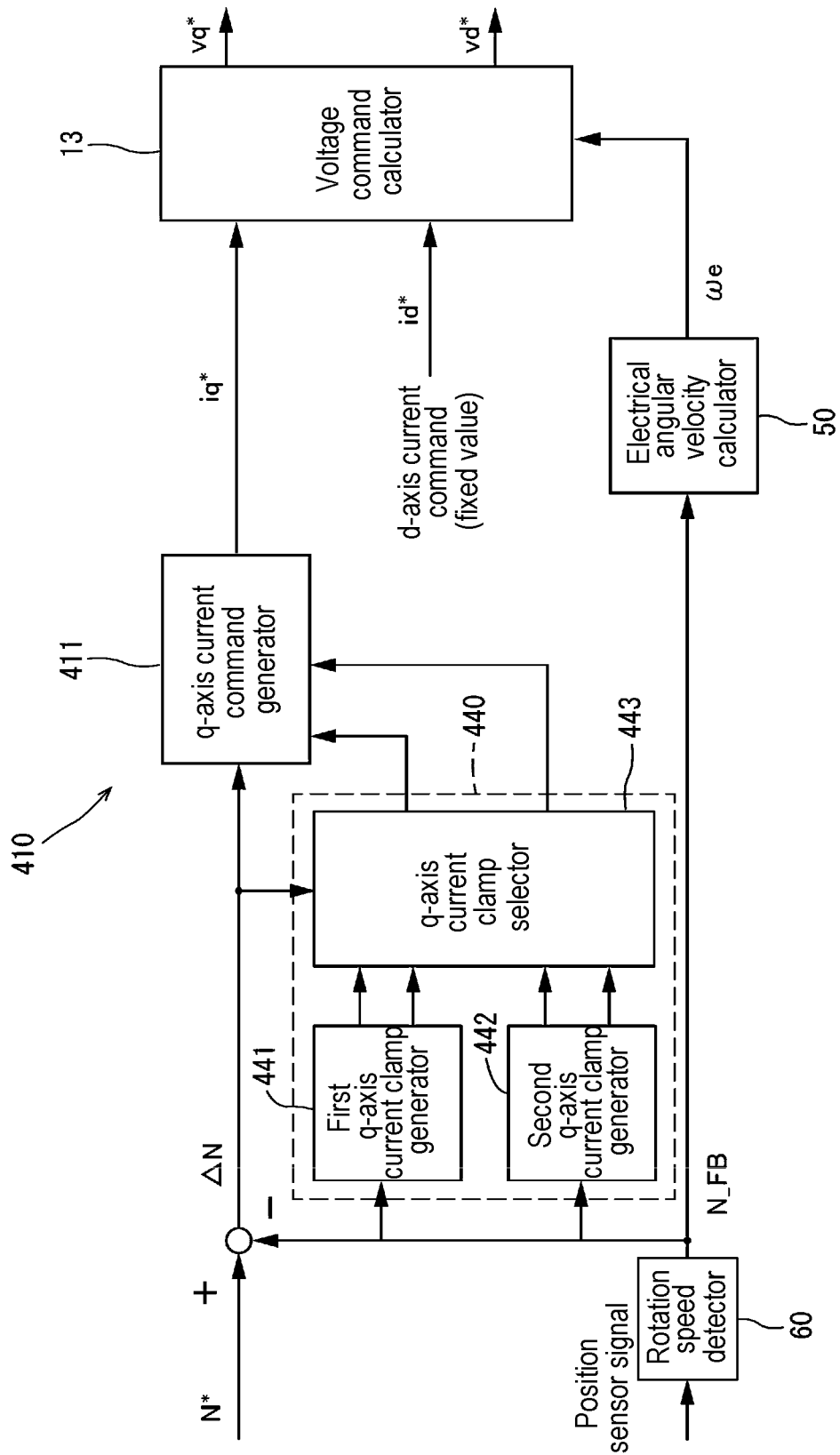
FIG. 13 is a block diagram showing a configuration from generation of a rotation speed command to generation of a voltage command in a control device according to a fifth embodiment.

FIG. 13 is a block diagram showing a configuration from the generation of a rotation speed command to the generation of a voltage command in a control device according to a fifth embodiment. In the present embodiment, the configuration of the command generator 410 is different from the configuration of the command generator 10 of the first embodiment in that the command generator 410 does not include a current command setting part. Hereinafter, the same components as those of the first embodiment are denoted by like reference numerals, and the description thereof is omitted. Only the components different from those of the first embodiment will be described.

When the d-axis current is set to zero or a fixed value in the same manner as in the above-described fourth embodiment, all except for iq and Te in the above-described equation (9) are constants.

Therefore, in the equation (9), when $Pn\{\varphi+(Ld-Lq)id\}=K$ (constant), $iq \cdot K=Te$ ... (12).

Since iq and Te have a proportional relationship as described above, it is possible to replace the torque with the q-axis current in the configuration of the first embodiment. That is, in the present embodiment, the q-axis current corresponds to an output torque related value.

Specifically, as shown in FIG. 13, the command generator 410 includes a q-axis current command generator 411 and a voltage command calculator 13.

The q-axis current command generator 411 generates a q-axis current command iq* based on the rotation speed deviation ΔN between the rotation speed command N* and the rotation speed N_FB of the motor 2 which is outputted from the rotation speed detector 60, and the q-axis current clamp value outputted from the q-axis current clamp generator 440 described later.

A d-axis current command id* of zero or a fixed value is inputted to the voltage command calculator 13. The voltage command calculator 13 calculates a q-axis voltage command vq* and a d-axis voltage command vd* based on the q-axis current command iq* generated by the q-axis current command generator 411 and the inputted d-axis current command id*.

In the present embodiment, a q-axis current clamp generator 440 (limit value setting part) is provided instead of the torque clamp generator. The q-axis current clamp generator 440 generates a q-axis current clamp value (limit value) for limiting the q-axis current, and outputs the q-axis current clamp value to the q-axis current command generator 411.

Specifically, the q-axis current clamp generator 440 includes a first q-axis current clamp generator 441 (first limit value generator), a second q-axis current clamp generator 442 (second limit value generator) and a q-axis current clamp selector 443 (limit value selector).

The first q-axis current clamp generator 441 generates a first q-axis current clamp value (first limit value) using the rotation speed N_FB of the motor 2 outputted from the rotation speed detector 60. The first q-axis current clamp generator 441 generates a positive q-axis current clamp value and a negative q-axis current clamp value as the first q-axis current clamp value. The first q-axis current clamp value is a value corresponding to the first torque clamp value of the first embodiment.

The second q-axis current clamp generator 442 generates a second q-axis current clamp value (second limit value) using the rotation speed N_FB of the motor 2 outputted from the rotation speed detector 60. The second q-axis current clamp generator 442 generates a positive q-axis current clamp value and a negative q-axis current clamp value as the second q-axis current clamp value. The second q-axis current clamp value is a value corresponding to the second torque clamp value of the first embodiment.

The q-axis current clamp selector 443 selects the first q-axis current clamp value generated by the first q-axis current clamp generator 441 or the second q-axis current clamp value generated by the second q-axis current clamp generator 442, whichever has a larger absolute value, and outputs the selected q-axis current clamp value as a q-axis current clamp value.

As with the torque clamp selector 43 of the first embodiment, the q-axis current clamp selector 443 selects and outputs the positive q-axis current clamp value generated by the first q-axis current clamp generator 441 or the positive q-axis current clamp value generated by the second q-axis current clamp generator 442, whichever has a larger absolute value. Furthermore, the q-axis current clamp selector 443 selects and outputs the negative q-axis current clamp value generated by the first q-axis current clamp generator 441 or the negative q-axis current clamp value generated by the second q-axis current clamp generator 442, whichever has a larger absolute value.

Since iq and Te have a proportional relationship as described above, each configuration of the q-axis current clamp generator 440 is equivalent to each configuration of the torque clamp generator 40 of the first embodiment in terms of control. That is, each configuration of the q-axis current clamp generator 440 has the same configuration as that of the torque clamp generator 40 of the first embodiment except that a q-axis current is used instead of the torque in the equation (12).

Similarly, the q-axis current command generator 411 is equivalent to the torque command generator 11 of the first embodiment in terms of control. The q-axis current command generator 411 has the same configuration as the torque command generator 11 except that a q-axis current is used instead of the torque in the equation (12).

Also with the configuration of the present embodiment, the motor 2 can be driven to follow the rotation speed command in the startup region of the rotation speed of the motor 2. Thus, the motor 2 can be driven stably in any rotation speed region.

Other Embodiments

Although the embodiments of the present disclosure have been described above, the above-described embodiments are nothing more than examples for implementing the present disclosure. Therefore, the present disclosure is not limited to the above-described embodiments, and may be appropriately modified and implemented without departing from the spirit of the present disclosure.

In the first to fourth embodiments, the second torque clamp generator 42 generates the torque clamp value (second torque clamp value) by using the torque corresponding to the maximum value $v_{Limit}^*$ of the magnitude of the voltage command vector in the PWM drive control. However, the torque used for calculating the torque clamp value may be an arbitrarily set value. Even in this case, it is necessary to determine the torque used for calculating the torque clamp value, so that the calculated torque clamp value is larger than the torque clamp value generated by the first torque clamp generator 41 and larger than the torque clamp value for continuously rotating the motor 2.

In the first to fourth embodiments, when selecting the first torque clamp value or the second torque clamp value, whichever has a larger absolute value, the torque clamp selector 43 determines whether the absolute value of the second torque clamp value is larger than the absolute value of the first torque clamp value. Alternatively, the torque clamp selector 43 may determine whether the absolute value of the first torque clamp value is larger than the absolute value of the second torque clamp value.

In the first to third embodiments, the q-axis current selector 16 and the d-axis current selector 17 determine whether the torque selection signal T_sel corresponds to the second torque clamp value, i.e., whether the torque clamp selector 43 has selected the second torque clamp value. Alternatively, the q-axis current selector 16 and the d-axis current selector 17 may determine whether the torque selection signal T_sel corresponds to the first torque clamp value, i.e., whether the torque clamp selector 43 has selected the first torque clamp value.

In each of the above-described embodiments, the PWM signal generator 20 generates the PWM signal for the PWM drive control based on the q-axis voltage command vq* and the d-axis voltage command vd* calculated by the voltage command calculator 13. In this case, the control device includes a phase calculator (not shown) for calculating a phase, which is arranged on a signal transmission path extending from the rotation speed detector 60 to the PWM signal generator 20 in the control block diagram of FIG. 1.

However, in the control device, a three-phase voltage command may be generated by the voltage command calculator and may be inputted to the PWM signal generator. In this case, for example, the control device includes a phase calculator for calculating a phase, which is arranged on a signal transmission path extending from the rotation speed detector 60 to the voltage command calculator 13 in the control block diagram of FIG. 1.

In each of the above-described embodiments, the configuration of the control device for controlling the drive of the three-phase AC motor has been described. However, the present disclosure is not limited thereto and may be applied to a control device for controlling the drive of an AC motor having multiple phases other than three phases. That is, the motor may have any configuration as long as it is a synchronous electric motor.

INDUSTRIAL USE OF THE PRESENT INVENTION

The present disclosure is applicable to a motor control device that performs a PWM drive control without performing current feedback.

What is claimed is:

1. A control device for a synchronous electric motor that controls a drive of the synchronous electric motor, comprising:

a limit value setting part configured to set a limit value for an output torque related value that is related to an output torque of the synchronous electric motor according to a rotation speed of the synchronous electric motor;

a command generator configured to generate a voltage command based on an input command and the limit value without feeding back a current flowing through the synchronous electric motor;

a PWM signal generator configured to generate a PWM signal for controlling the drive of the synchronous electric motor based on the voltage command; and a drive controller configured to control the drive of the synchronous electric motor using the PWM signal, wherein the limit value setting part sets a start time limit value as the limit value in a startup region of the rotation speed of the synchronous electric motor, and sets a normal time limit value as the limit value in a region other than the startup region of the rotation speed of the synchronous electric motor, and wherein the start time limit value is larger than the normal time limit value and larger than the output torque related value capable of continuously rotating the synchronous electric motor at the rotation speed in the startup region.

2. The control device of claim 1, wherein the start time limit value is equal to or smaller than the output torque related value corresponding to a maximum value of a magnitude of a voltage command vector of the synchronous electric motor according to the PWM signal.

3. The control device of claim 1, wherein the limit value setting part includes:

a first limit value generator configured to generate a first limit value including the normal time limit value at each rotation speed of the synchronous electric motor;

a second limit value generator configured to generate a second limit value including the start time limit value that is larger than the normal time limit value in the startup region and larger than the output torque related value capable of continuously rotating the synchronous electric motor at each rotation speed of the synchronous electric motor; and a limit value selector configured to select, as the limit value, the first limit value generated by the first limit value generator or the second limit value generated by the second limit value generator, whichever has a larger absolute value, at each rotation speed of the synchronous electric motor.

4. The control device of claim 3, wherein the command generator includes:

a first command signal generator configured to generate a first command signal using the first limit value;

a second command signal generator configured to generate a second command signal using the second limit value; and a command signal selector configured to select one of the first command signal and the second command signal depending on which of the first limit value and the second limit value is selected by the limit value selector at each rotation speed of the synchronous electric motor, wherein the command generator is configured to output, as the voltage command, a voltage command corresponding to the command signal selected by the command signal selector.

5. A control method for a synchronous electric motor that controls a drive of the synchronous electric motor, comprising:

a rotation speed acquisition step of acquiring a rotation speed of the synchronous electric motor;

a first limit value generation step of generating a first limit value including a normal time limit value at each rotation speed of the synchronous electric motor;

a second limit value generation step of generating a second limit value including a start time limit value that is larger than the normal time limit value in a startup region of the synchronous electric motor and larger than an output torque related value capable of continuously rotating the synchronous electric motor at each rotation speed of the synchronous electric motor;

a limit value selection step of selecting, as a limit value, the first limit value generated in the first limit value generation step or the second limit value generated in the second limit value generation step, whichever has a larger absolute value, at each rotation speed of the synchronous electric motor;

a command signal output step of outputting, as a command signal, one of a first command signal generated using the first limit value and a second command signal generated using the second limit value depending on which of the first limit value and the second limit value is selected as the limit value in the limit value selection step at each rotation speed of the synchronous electric motor; and a voltage command calculation step of calculating a voltage command corresponding to the command signal outputted in the command signal output step.

* * * * *